United States Patent
Li et al.

(10) Patent No.: US 11,389,861 B2
(45) Date of Patent: Jul. 19, 2022

(54) CARBON FIBERS IN CERAMIC CORES FOR INVESTMENT CASTING

(71) Applicant: General Electric Company, Schenectady, NY (US)

(72) Inventors: Tao Li, Blue Ash, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/162,779

(22) Filed: Jan. 29, 2021

(65) Prior Publication Data

US 2021/0197249 A1 Jul. 1, 2021

Related U.S. Application Data

(62) Division of application No. 15/689,748, filed on Aug. 29, 2017, now abandoned.

(51) Int. Cl.
| | |
|---|---|
| *B22C 9/10* | (2006.01) |
| *B22C 1/00* | (2006.01) |
| *B22D 19/00* | (2006.01) |
| *B21D 53/78* | (2006.01) |
| *C04B 35/80* | (2006.01) |
| *C04B 35/01* | (2006.01) |
| *F01D 5/18* | (2006.01) |
| *B22C 7/06* | (2006.01) |
| *C04B 35/63* | (2006.01) |
| *C04B 35/18* | (2006.01) |
| *C04B 38/06* | (2006.01) |

(Continued)

(52) U.S. Cl.
CPC ................ *B22C 9/10* (2013.01); *B21D 53/78* (2013.01); *B22C 1/00* (2013.01); *B22C 7/06* (2013.01); *B22D 19/0072* (2013.01); *C04B 35/013* (2013.01); *C04B 35/18* (2013.01); *C04B 35/6269* (2013.01); *C04B 35/6316* (2013.01); *C04B 35/80* (2013.01); *C04B 38/065* (2013.01); *F01D 5/18* (2013.01); *B22C 9/24* (2013.01); *C04B 2235/483* (2013.01); *C04B 2235/5264* (2013.01); *C04B 2235/5296* (2013.01); *C04B 2235/6027* (2013.01); *C04B 2235/6567* (2013.01); *C04B 2235/661* (2013.01); *C04B 2235/80* (2013.01); *F05D 2230/21* (2013.01)

(58) Field of Classification Search
CPC .... B22C 1/00; B22C 7/06; B22C 9/10; B22C 9/24; B22D 19/00; B22D 19/0072
USPC .................................................... 164/28, 369
See application file for complete search history.

(56) References Cited

U.S. PATENT DOCUMENTS

| | | |
|---|---|---|
| 4,427,742 A | 1/1984 | Willgoose et al. |
| 5,660,524 A | 8/1997 | Lee et al. |
| 5,744,173 A | 4/1998 | Sterett |

(Continued)

FOREIGN PATENT DOCUMENTS

| | | |
|---|---|---|
| CN | 101219461 A | 7/2008 |
| CN | 102489670 A | 6/2012 |

(Continued)

*Primary Examiner* — Kevin P Kerns
(74) *Attorney, Agent, or Firm* — Dority & Manning, P.A.

(57) ABSTRACT

A method of producing a ceramic core for investment casting is provided. The method includes injecting a slurry into a disposable die. The slurry includes ceramic particles, a binder, and carbon fibers. The method also includes a first heating to eliminate the disposable die, leaving a cured ceramic core including the ceramic particles, binder, and carbon fibers.

15 Claims, 6 Drawing Sheets

(51) Int. Cl.
C04B 35/626 (2006.01)
B22C 9/24 (2006.01)

(56) References Cited

U.S. PATENT DOCUMENTS

| | | |
|---|---|---|
| 5,939,216 A | 8/1999 | Kameda et al. |
| 5,944,087 A | 8/1999 | Sterett |
| 6,029,738 A | 2/2000 | Matuura et al. |
| 6,036,441 A | 3/2000 | Manning et al. |
| 6,168,381 B1 | 1/2001 | Reddy |
| 6,286,582 B1 | 9/2001 | Chartier et al. |
| 6,364,000 B2 | 4/2002 | Naik et al. |
| 6,460,599 B1 | 10/2002 | Naik et al. |
| 6,568,458 B2 | 5/2003 | Naik et al. |
| 6,595,748 B2 | 7/2003 | Flodman et al. |
| 6,832,889 B1 | 12/2004 | Lee et al. |
| 7,487,819 B2 | 2/2009 | Wang et al. |
| 8,286,689 B1 | 10/2012 | Bochiechio |
| 2004/0029706 A1 | 2/2004 | Barrera et al. |
| 2010/0048374 A1 | 2/2010 | Liu et al. |
| 2015/0367412 A1 | 12/2015 | Wagner et al. |
| 2016/0010471 A1 | 1/2016 | Pabla et al. |
| 2016/0167112 A1 | 6/2016 | Carr et al. |
| 2017/0144216 A1 | 5/2017 | Yang et al. |

FOREIGN PATENT DOCUMENTS

| | | |
|---|---|---|
| CN | 104399885 A | 3/2015 |
| CN | 106903261 A | 6/2017 |
| EP | 2463043 A1 | 6/2012 |
| GB | 2202542 A | 9/1988 |
| JP | 5348026 | 5/1978 |
| JP | 2008142781 A | 6/2008 |

CARBON FIBERS IN CERAMIC CORES FOR INVESTMENT CASTING

CROSS REFERENCE TO RELATED APPLICATION

This application is a divisional of U.S. patent application Ser. No. 15/689,748 entitled "CARBON FIBERS IN CERAMIC CORES FOR INVESTMENT CASTING", filed Aug. 29, 2017; now abandoned, which is incorporated herein by reference.

INTRODUCTION

The present disclosure generally relates to investment casting components and methods for making them. In particular, the present disclosure relates to ceramic cores used to produce internal channels inside turbine blades in the investment casting process.

BACKGROUND

Investment casting often utilizes cores to produce internal channels inside cast metals. A molten metal or alloy is poured into a mold containing a core. After the metal solidifies, the core is removed to leave behind the internal channels. The architecture of the internal channels is determined by the features of the core.

Cores formed through injection molding and other conventional processes can produce simple hollow channel architectures. However in some applications, such as cast blades for gas turbines, more complex channel geometries are desirable due to their improved blade performance, where air is blown through the hollow channels of the cast blade for cooling. Improved blade cooling performance can take the form of reduced cooling air flow, which allows for increased utilization of air for combustion and thus increases engine thrust. Higher blade cooling performance allows for an increase in combustor operating temperature and improved thermodynamic efficiency, resulting in better specific fuel consumption, while still maintaining turbine blade component temperatures within an acceptable range for durability. Especially useful channel geometries for turbine blade cooling circuits are described in, for instance, U.S. Pat. Nos. 5,660,524, 6,036,441, 6,168,381, 6,595,748 and 6,832,889. A major limitation to commercial implementation of these representative cooling circuits in turbine blades is the inability to produce the necessary ceramic cores as single piece articles by conventional molding techniques. Examination of the cooling circuit geometries of interest shows that there exists no single parting line allowing the construction of separable mold halves to enable removal of a molded part without destroying part of the formed structure. Accordingly, production of cores to produce such sophisticated cooling circuits requires elaborate multi-step processes where the geometry is broken up into several moldable sections, each with its own separate mold tooling. The individual molded sections are then assembled after molding and firing, with a concomitant reduction in core yield for precision investment casting, due to the loss of registry between the parts. The multi-piece process is also much more expensive due to the capital cost of multiple mold tools, the hand work needed for core finishing and assembly, and the further reduction in net casting yield, due to the poorer dimensional tolerances and mechanical stability during casting of the multi-piece core assembly.

One way to produce cores with both simple and complex channel architectures is with disposable core dies (DCD) described in, for instance, U.S. Pat. No. 7,487,819. The core is formed by injecting a slurry containing ceramic particles and an organic binder into a disposable core die. The slurry is then cured and then fired to produce a solidified ceramic core. The disposable core die can be removed before, during or after the core firing process, for instance by a chemical, thermal or mechanical process.

Ceramic core materials used in the investment casting industry are often made predominately of silica ($SiO_2$). Silica is a commonly used core material in investment casting because of its low coefficient of thermal expansion, high-temperature dimensional stability, and its ease of removal from the casting. Articles made by investment casting are cast metal or metal alloys. In some instances, this metal may react with the conventional silica-based ceramic core. Therefore, the use of silica-containing core materials for casting of reactive metals is known to be problematic, as silica may react with certain metals during the casting process.

Yttrium addition to an alloy is one approach for improving the oxidation resistance of nickel-based superalloys at the service temperature of turbine airfoils. However, yttrium can react with silica during casting, leading to depletion of the yttrium in the alloy and introducing components into the alloy that debit the mechanical properties and the ability to further process turbine airfoils, resulting major limitations in using silica cores for the casting of these (reactive) nickel-based superalloys.

Alumina and yttria materials have been used in casting to reduce or eliminate this reactivity problem. Alumina, for instance, is less reactive than silica. However, alumina is harder to process than silica materials with respect to higher temperatures required for processing. This introduces problems with dimensional tolerances because of the higher coefficient of thermal expansion and inherent large creep rate relative to silica. Alumina cores can also require more extreme leaching conditions for their removal after casting because of their lower solubility and/or leach rates. These constraints apply equally to ceramic cores formed through conventional methods such as injection molding, as well as those formed by the DCD process.

Therefore, there is a need for a low reactivity material system compatible with DCD processing for producing cores that can generate cast articles with complex internal channel architectures made using reactive metals and alloys.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

The foregoing and/or other aspects of the present invention may be achieved by a method of producing a ceramic core for investment casting. In one aspect, the method includes injecting a slurry into a disposable die, the slurry including ceramic particles, a binder, and carbon fibers. The method also includes a first heating to eliminate the disposable die, leaving a cured ceramic core including the ceramic particles, binder, and carbon fibers.

The foregoing and/or aspects of the present invention may also be achieved by a method of making a cast metal component including providing a non-reactive ceramic core including ceramic particles, a binder, and carbon fibers to contact with a reactive metal to produce the cast metal component.

The foregoing and/or aspects of the present invention may also be achieved by a cured ceramic core including ceramic particles, a binder, and carbon fibers, the core having voids substantially throughout and generally aligned with an axis of the core.

Other features and aspects may be apparent from the following detailed description, the drawings, and the claims.

DETAILED DESCRIPTION

Figure 1:
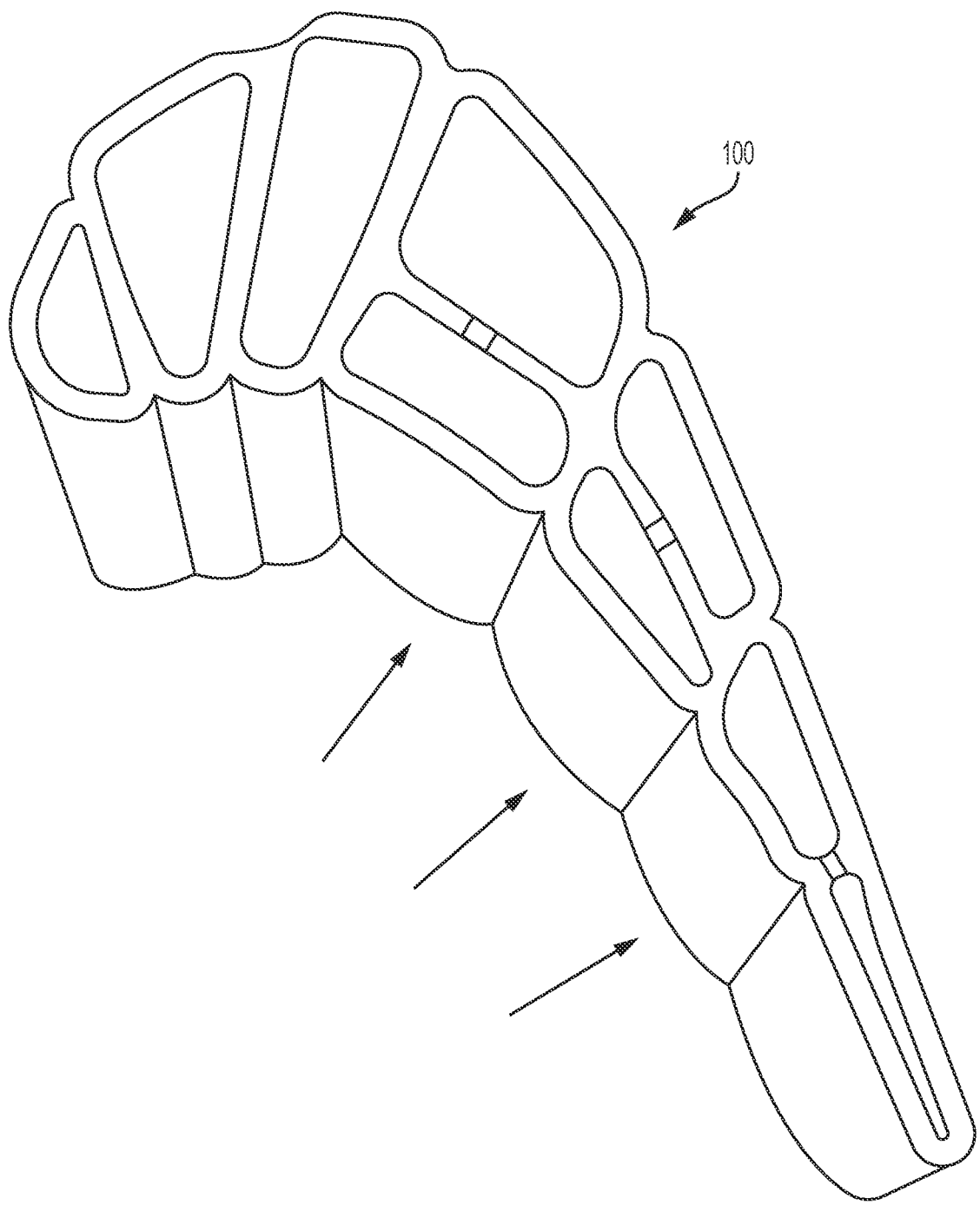
FIG. 1 is an illustration of a thin wall disposable core die.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Ceramic cores are used to produce internal channels inside turbine blades in the investment casting process. Blades made of Y-bearing metals or alloys improve engine service temperatures by 50° C. The use of the silica-based cores for casting of these reactive metals or alloys poses melting issues, as silica reacts with certain metals during the casting process. US 2017/0144216 assigned to General Electric Company, and hereby incorporated by reference, discloses a ceramic core comprising alumina particles and siloxane binders; non-reactive cores that reduce or eliminate the reactivity problem.

Especially, cores based on non-reactive $Al_2O_3$/mullite formulation need to possess significantly more porosity so that the core may be readily removed from the internal of a blade, and yet structurally strong enough to survive the core manufacturing process. The present invention provides a method to produce core bodies with improved mechanical strength and increased porosity by introducing an optimum amount of carbon fibers to the non-reactive core fabrication process.

The non-reactive cores according to an aspect of the invention include siloxane binders, fugitive species, and ceramic powders. The siloxane binders and fugitive species, upon thermal decomposition, create porosity in the final core body. Both pre-existing and newly formed ceramic phases give strength to a core body to maintain dimensional integrity. Further improvements on core and casting quality call for higher mechanical strength. On the other hand, a porosity of more than 40 vol % with an interconnected pore structure helps to increase the leaching efficiency during the core removal process.

To address the seemingly contradictory requirements, the present invention provides $Al_2O_3$-siloxane based slurry with added carbon fiber for making ceramic cores using the DCD process. The carbon fibers strengthen the core body during the manufacturing process and introduce additional porosity in the finished core for the ease of core leaching. Thus, the present invention provides ceramic cores with unique features that include open porosity, and increased mechanical strength at the same time. Traditional metal dies or DCD may be used for this process, as may injection molding or any other type of conventional molding.

The present invention provides a ceramic core which has compatibility with the DCD process, is substantially non-reactive during casting, and allows for the production of structures with intricate internal shapes while possessing the compatibility with the alloy sought for articles formed by investment casting.

As mentioned above, slurry may be transferred into a disposable core die. Once the slurry is transferred into the die, the slurry may be cured to form a solidified article, that is, for example, a green body. In some embodiments, the temperature for curing is between 25° C. and 110° C. In other embodiments, the temperature for curing is between 40° C. and 80° C. In still other embodiments, the temperature for curing is between 50° C. and 70° C. In yet other embodiments, the temperature for curing is between 55° C. and 65° C. In some embodiments, the time for curing is between 1 hour and 24 hours. Any time and temperature combination that will cure the slurry to a green body is acceptable. As a non-limiting example, the curing step may be approximately two hours at 50° C. As another non-limiting example, the curing step may be approximately 24 hours at 35° C. In another non-limiting example, the curing may be for 6 hours at 55° C. The cured product includes a semi-hardened ceramic material including fibers encased in the DCD die.

In some embodiments, the conversion occurs in a two-step firing process. The first low-temperature firing step converts the silicon in the siloxane binder to amorphous silica while not significantly degrading carbon fibers in the core body. This "low fire" step, in some embodiments, burns off the die. In some embodiments, the first step is performed for between 10 and 20 hours. In some embodiments, the first step is performed for between 12 and 18 hours. In other embodiments, the first step is performed for approximately 16 hours. In some of these embodiments, the first temperature is between 250° C. and 750° C., or the first temperature is between 350° C. and 650° C. In other embodiments, the first temperature is between 400° C. and 600° C., or the first temperature is between 450° C. and 550° C.

The core then undergoes further heat treatment (i.e., a high-temperature firing). In this step, the amorphous silica in combination with the excess alumina is converted to mullite and the carbon fibers are totally burnt out, resulting in a desired microstructure with a predominantly elongated pore structure. In some embodiments, the temperature for this conversion is between 1050° C. and 1700° C., or between 1150° C. and 1650° C., or between 1200° C. and 1650° C. In some embodiments, the temperature for this conversion is between 1400° C. and 1650° C., or the temperature for this step is between 1450° C. and 1650° C. In still other embodiments, the temperature for this step is between 1500° C. and 1650° C., or the temperature for this step is between 1500° C. and 1600° C. In some embodiments, the temperature for this conversion is between 1550° C. and 1650° C., or the temperature for this conversion is between 1575° C. and 1625° C. In other embodiments, the temperature for this conversion is between 1400° C. and 1600° C., or the temperature for this conversion is between 1450° C. and 1600° C. In yet other embodiments, the temperature for this conversion is between 1550° C. and 1600° C. In some embodiments, the time utilized for this conversion is between one hour and 24 hours. In some embodiments, the time utilized for this conversion is between one hour and 12 hours. In some embodiments, the time utilized for this conversion is between one hour and 6 hours. In some embodiments, the time utilized for this conversion is one hour. Any time and temperature combination that will maximize the conversion of the amorphous silica-containing core to a mullite-containing ceramic core as described herein is acceptable.

In some embodiments, there may be three separate heating events used for this procedure. In the first heating event, the slurry is cured to form a green body. The second heating event is the low fire step described above. The third heating event is the conversion of silica in the presence of excess alumina to mullite. In some embodiments, the curing and firing steps may be accomplished in a single furnace in a single run. In other embodiments, the firing steps may be accomplished in a single furnace in a single run.

The formed ceramic core comprises mullite, alumina, and free silica. Free silica may be present in the ceramic core, but much of this silica is encapsulated by mullite, rendering it "hidden" (or "substantially non-reactive") from the metal, not available for reaction with metal alloy on a continuous basis, functionally inert, and compatible with casting of reactive alloys. There may be some free silica present in the ceramic core that is potentially reactive, but these amounts should be minimal. In some embodiments, the ceramic core contains up to 11 wt % free silica, or the ceramic core contains up to 10 wt % free silica, or the ceramic core contains up to 8 wt % free silica. In some embodiments, the ceramic core contains up to 6 wt % free silica, or the ceramic core contains up to 3 wt % free silica. In some embodiments, the ceramic core contains up to 1 wt % free silica. In some embodiments, the ceramic core contains between 0.1 wt % and 10 wt % free silica. In other embodiments, the ceramic core contains between 0.1 wt % and 5 wt % free silica, or between 0.1 wt % and 6 wt % free silica. In still other embodiments, the ceramic core contains between 1 wt % and 10 wt % free silica. In some embodiments, the ceramic core contains between 1 wt % and 5 wt % free silica, or between 0.1 wt % and 3 wt % free silica. In yet other embodiments, the ceramic core contains between 1 wt % and 3 wt % free silica, or the ceramic core contains between 0.5 wt % and 1 wt % free silica. In some embodiments, the ceramic core contains between 2 wt % and 8 wt % free silica. In still other embodiments, the ceramic core contains between 3 wt % and 6 wt % free silica. In other embodiments, the ceramic core contains between 0.1 wt % and 1 wt % free silica.

For purposes of this disclosure, the majority of the silicon-containing constituents initially present in the slurry in the form of siloxane binders are converted to the silicon-containing 3:2 mullite phase. However, it is to be understood that, in addition to 3:2 mullite and alumina, the thermally-converted slurry may also include other materials, such as silica, other $Al_2O_3$—$SiO_2$ polyforms that are below the XRD detection limit. The remaining free silica may be encapsulated by the formed mullite, rendering it non- or minimally-reactive for subsequent casting steps.

According to an aspect, the present invention incorporates carbon fiber into the core formulations for producing ceramic cores.

Figure 2:
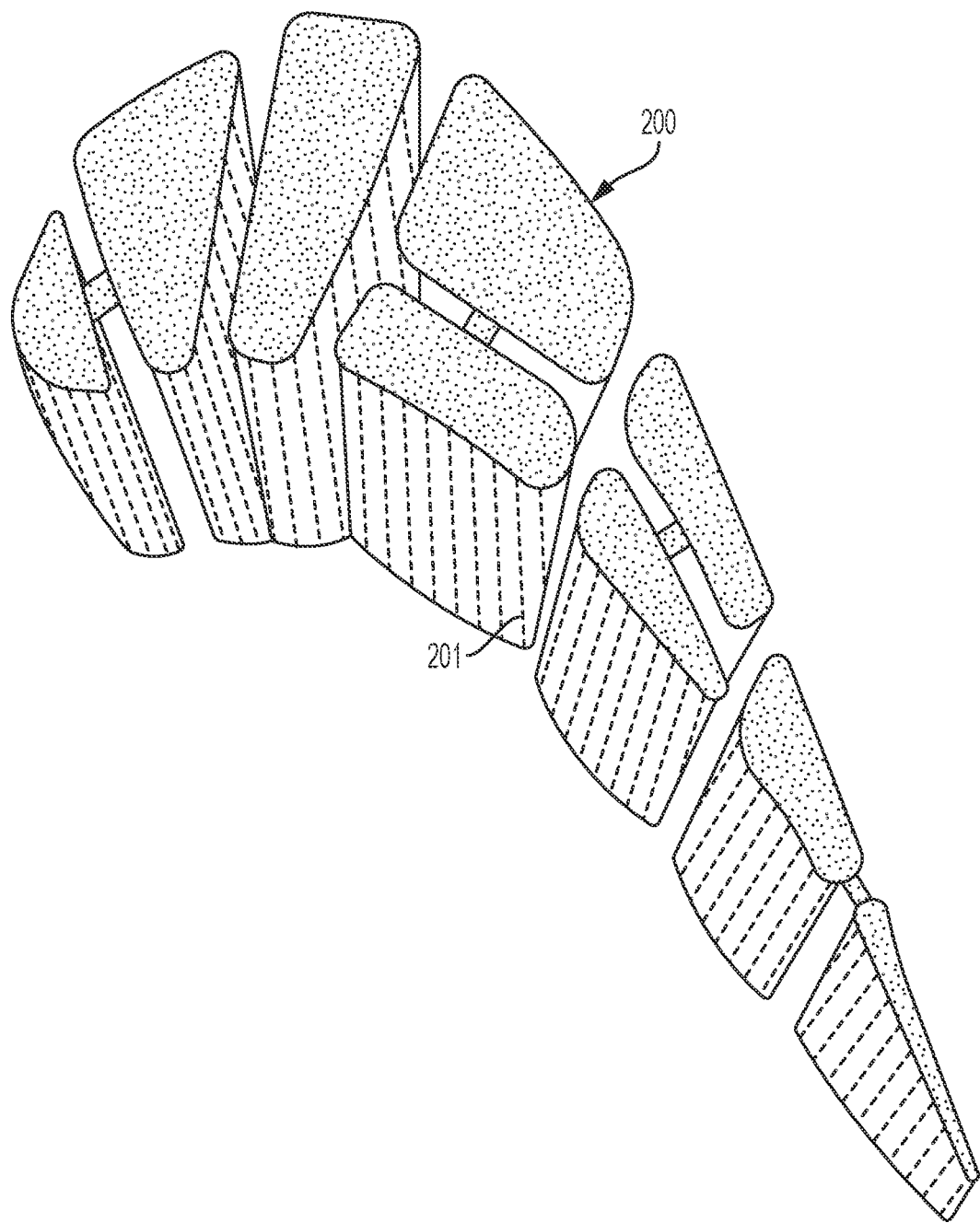
FIG. 2 is an illustration of a solidified ceramic core showing fibers oriented predominantly along the flow of the slurry, according to an embodiment of the present invention.

FIG. 1 is an illustration of a thin wall disposable core die 100 that can be used to manufacture a turbine airfoil. A slurry comprising ceramic particles, a binder, and carbon fibers according to an embodiment of the present invention may be directionally added into the interstices and channels of the thin wall disposable core die 100. The slurry is then subjected to curing to form a cured ceramic core. The disposable core die 100 is removed to leave behind the cured ceramic core as shown in FIG. 2. FIG. 2 is an illustration of the cured ceramic core after being fired to form a solidified ceramic core 200. The carbon fibers 201 align in the direction of slurry flow as shown, for example, in FIG. 2.

Figure 3:
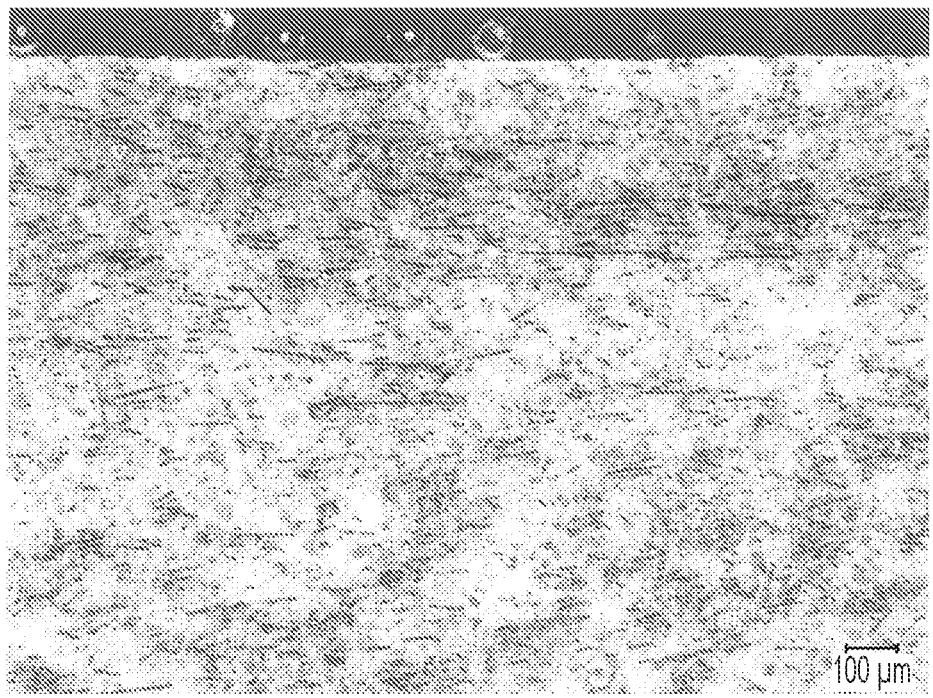
FIG. 3 shows a scanning electron microscopy (SEM) micrograph of a longitudinal view on a polished surface showing fibers orienting predominantly along the flow of slurry.

FIG. 3 shows a scanning electron microscopy (SEM) micrograph of a longitudinal view on a polished surface showing carbon fibers orienting predominantly along the flow of slurry. The sample was fired up to 500° C. According to an embodiment as shown in FIG. 3, during the slurry injection molding process, carbon fibers orient predominantly along the direction of slow flow. This carbon fiber alignment is critical in reducing cracks during the subsequent plastic die removing phase. Carbon fibers remain in the core body after thermal decomposition of plastic die around 500° C. (first fire), reinforcing the core body because carbon fibers do not oxide until at a higher temperature.

Figure 4:
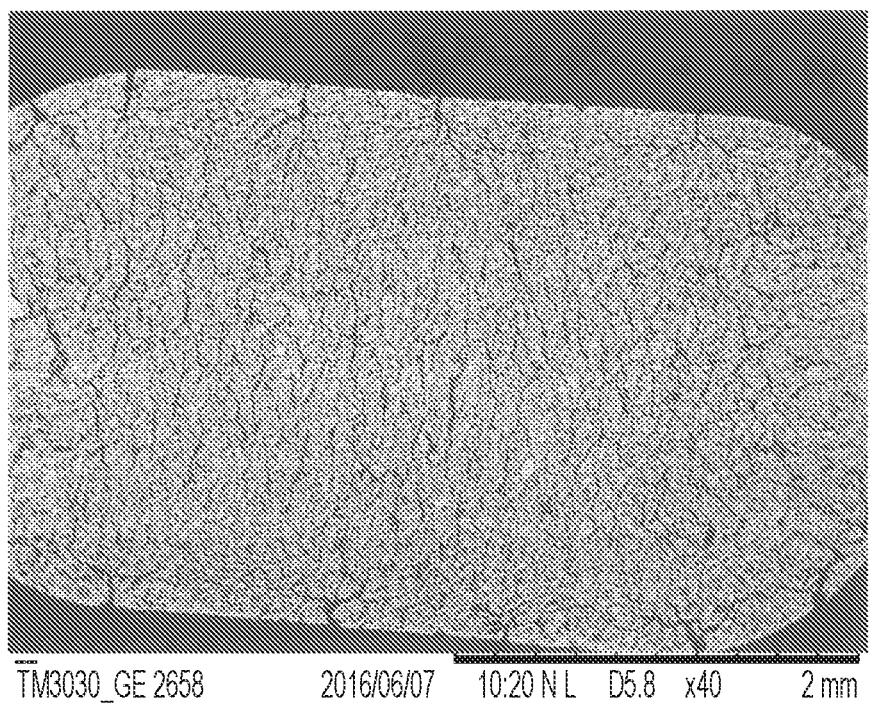
FIG. 4 shows a SEM micrograph of a transverse view on a polished surface showing extensive cracks (~10 nm in width) leading to the part interior.

During the subsequent second/setter fire up to 1650° C. in air, carbon fibers fully oxidize to CO and $CO_2$. These gaseous species evaporate from the cores, creating interconnected pore structure within the cores. The resultant pore structure aids the leaching process in the core removal step. FIG. 4 shows a SEM micrograph of a transverse view on a polished surface showing extensive cracks (~10 μm in width) leading to the part interior. The sample was fired up to 1650° C.

Figure 5:
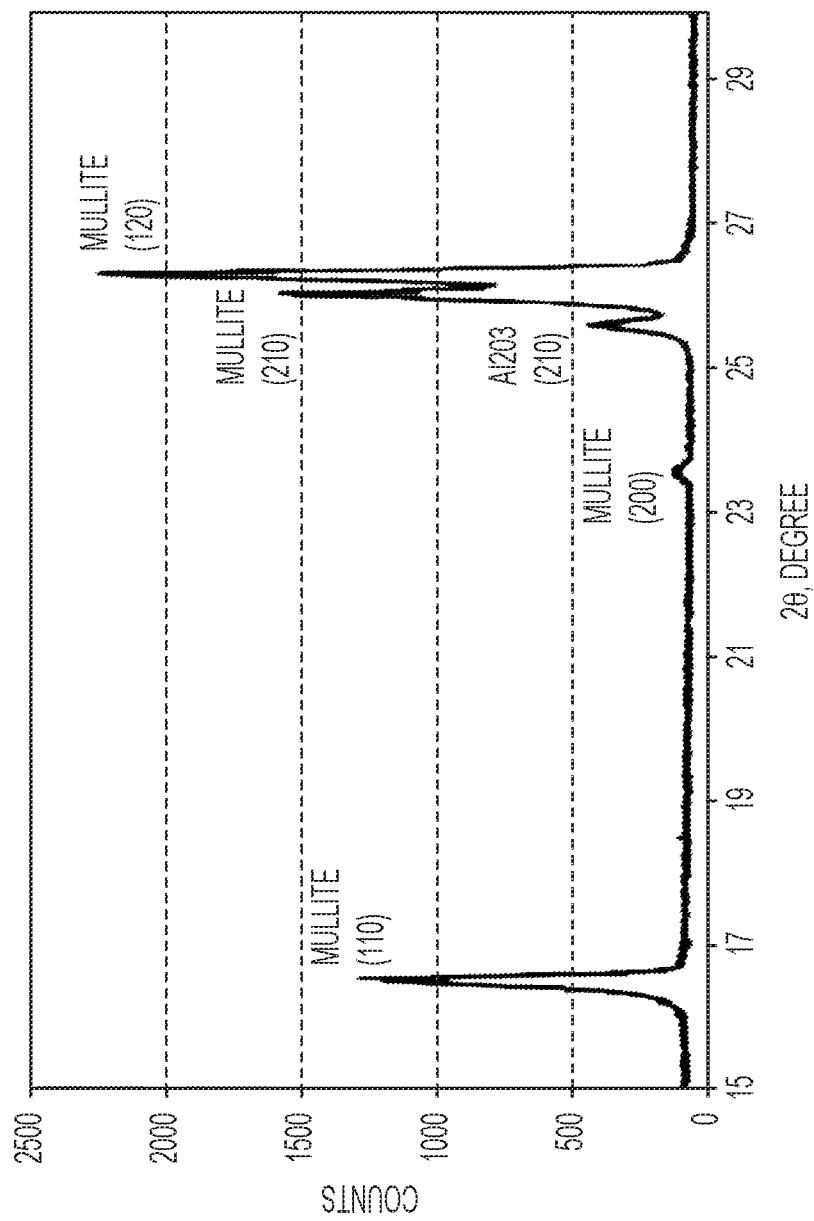
FIG. 5 XRD Spectrum of an as-fired Surface of a core fired up to 1650° C.
Figure 6:
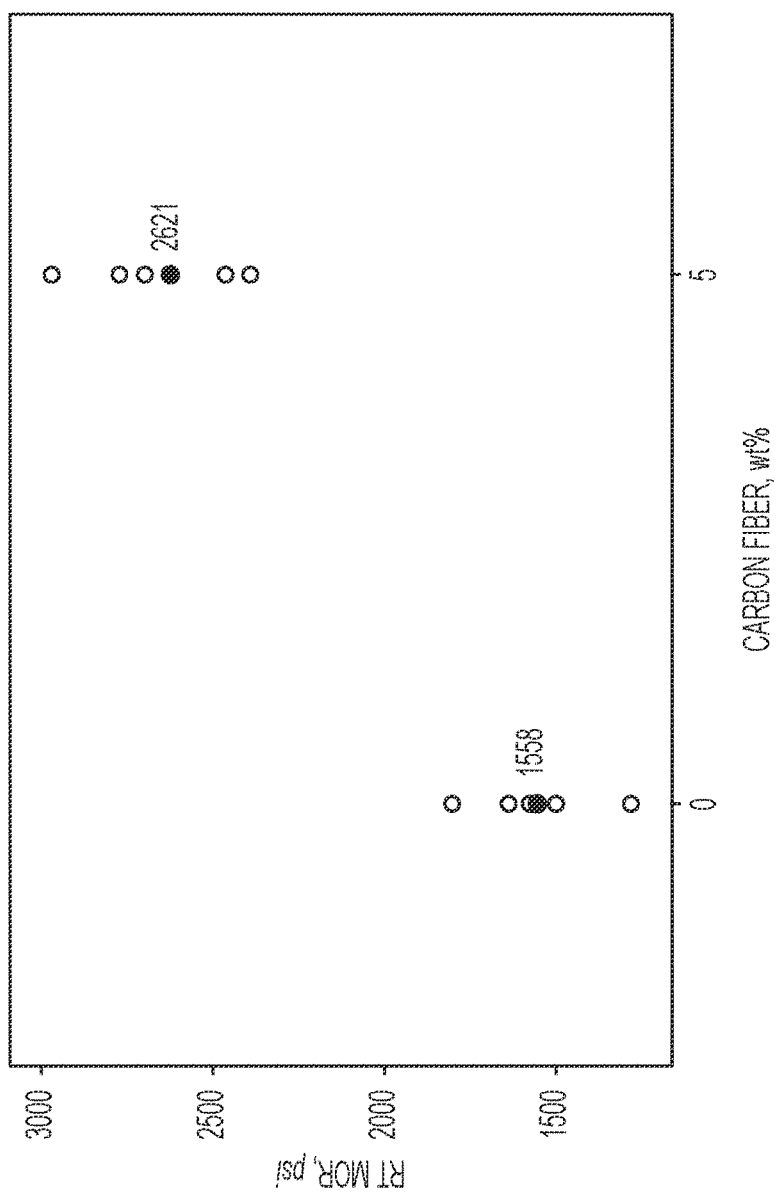
FIG. 6 illustrates an increase in the Modulus of Rupture at room temperature (RT MOR) with the addition of carbon fiber.

FIG. 5 is a XRD spectrum on an as-fired surface of a core fired up to 1650° C. in air. It demonstrates that the remaining phases are 3:2 mullite and α-Al2O2. FIG. 6 illustrates an increase in the Modulus of Rupture at room temperature (RT MOR) with the addition of carbon fiber. The 4 point bend results are from 5" long test bars fired up to 1650° C. As illustrated in FIG. 6, the unique microstructure due to transient carbon fiber reinforcement improves mechanical strength to help cores maintain structure integrity while achieving higher porosity.

After metal casting, the disposable core die may be removed using chemical, thermal, mechanical methods or a combination comprising at least one of the foregoing methods. Examples of such methods include chemical dissolution, chemical degradation or a combination comprising at least one of the foregoing methods of removing. In the case of a turbine blade, the core may be leached from the cast metal turbine blade using a caustic agent that dissolves the ceramic core while not affecting the cast metal part.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method of producing a ceramic core comprising:
   injecting an $Al_2O_3$-siloxane based slurry into a disposable die, the $Al_2O_3$-siloxane based slurry comprising ceramic particles, binders, and carbon fibers, the carbon fibers aligned in a direction of slurry flow upon injection;
   converting silicon in the $Al_2O_3$-siloxane based slurry to amorphous silica in a first firing step at a first temperature and a first length of time; and
   removing the carbon fibers and converting the amorphous silica and excess $Al_2O_3$ to mullite in a second firing step at a second temperature and a second length of time, wherein the second temperature is higher than the first temperature.

2. The method of claim 1, wherein the first temperature is between 250° C. and 750° C.

3. The method of claim 1, wherein the second temperature is between 1050° C. and 1700° C.

4. The method of claim 1, wherein the first temperature is between 250° C. and 750° C. and the second temperature is between 1050° C. and 1700° C.

5. The method of claim 4, wherein the first length of time is between 10 hours and 20 hours and the second length of time is between one hour and 24 hours.

6. The method of claim 1, wherein the first length of time is between 10 hours and 20 hours.

7. The method of claim 1, wherein the second length of time is between one hour and 24 hours.

8. The method of claim 1, further comprising curing the $Al_2O_3$-siloxane based slurry at a curing temperature between 25° C. and 110° C. and a curing time between one hour and 24 hours prior to converting silicon to amorphous silica.

9. The method of claim 1, wherein at least a portion of the ceramic core is configured to define an internal surface of a turbine blade.

10. The method of claim 1, wherein the $Al_2O_3$-siloxane based slurry includes the carbon fibers in a concentration not exceeding 20 weight percent of the $Al_2O_3$-siloxane based slurry.

11. The method of claim 1, wherein the carbon fibers have an average diameter of 200 microns or less.

12. The method of claim 1, wherein the carbon fibers have an average diameter of 100 microns or less.

13. The method of claim 1, wherein the carbon fibers have an aspect ratio of 1:1 up to 100:1.

14. The method of claim 1, wherein the carbon fibers have an aspect ratio of 10:1 up to 100:1.

15. The method of claim 1, further comprising removing the disposable die.

* * * * *